(12) United States Patent
Guo et al.

(10) Patent No.: US 9,407,570 B2
(45) Date of Patent: Aug. 2, 2016

(54) METHOD, APPARATUS, AND SYSTEM FOR ALLOCATING CDN VOLUME

(71) Applicant: TENCENT TECHNOLOGY (SHENZHEN) COMPANY LIMITED, Shenzhen (CN)

(72) Inventors: Xiaofeng Guo, Shenzhen (CN); Xianneng Zou, Shenzhen (CN); Xianfeng Mo, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 251 days.

(21) Appl. No.: 14/153,731

(22) Filed: Jan. 13, 2014

(65) Prior Publication Data

US 2014/0129720 A1 May 8, 2014

Related U.S. Application Data

(63) Continuation of application No. PCT/CN2013/072293, filed on Mar. 7, 2013.

(30) Foreign Application Priority Data

Mar. 9, 2012 (CN) .......................... 2012 1 0061127

(51) Int. Cl.
*H04L 12/911* (2013.01)
*H04L 29/08* (2006.01)

(52) U.S. Cl.
CPC .............. *H04L 47/70* (2013.01); *H04L 67/289* (2013.01); *H04L 67/2842* (2013.01)

(58) Field of Classification Search
None
See application file for complete search history.

(56) References Cited

U.S. PATENT DOCUMENTS

| | | | | |
|---|---|---|---|---|
| 6,078,943 A * | 6/2000 | Yu | ............................ | G06F 9/505 718/102 |
| 7,962,597 B2 * | 6/2011 | Richardson | ....... | H04L 29/12066 709/203 |
| 7,991,910 B2 * | 8/2011 | Richardson | ....... | H04L 29/12066 709/203 |
| 8,028,090 B2 * | 9/2011 | Richardson | ....... | H04L 29/12066 709/203 |
| 8,073,940 B1 * | 12/2011 | Richardson | ......... | H04L 67/1097 709/200 |
| 8,180,720 B1 * | 5/2012 | Kovacs | ............... | H04L 67/2842 706/47 |
| 2002/0163882 A1* | 11/2002 | Bornstein | ............... | H04L 29/06 370/227 |
| 2008/0147866 A1* | 6/2008 | Stolorz | ............... | H04L 12/2602 709/226 |
| 2011/0145317 A1* | 6/2011 | Serban | .................... | H04W 4/00 709/203 |

FOREIGN PATENT DOCUMENTS

| | | |
|---|---|---|
| CN | 101404585 A | 4/2009 |
| CN | 101764747 A | 6/2010 |
| WO | 2006002659 A1 | 1/2006 |

OTHER PUBLICATIONS

The World Intellectual Property Organization (WIPO) International Search Report for PCT/CN2013/072293 Mar. 7, 2013.

* cited by examiner

*Primary Examiner* — Thomas Dailey
(74) *Attorney, Agent, or Firm* — Anova Law Group, PLLC (57) ABSTRACT

Various embodiments provide methods, apparatus, and systems for allocating content delivery network (CDN) volume. In an exemplary method, a business visit request can be received. Based on at least one of a time allocation strategy, a request number allocation strategy, and a regional allocation strategy, the business visit request can be dispatched to CDN servers for handling the business visit request.

18 Claims, 4 Drawing Sheets

METHOD, APPARATUS, AND SYSTEM FOR ALLOCATING CDN VOLUME

CROSS-REFERENCES TO RELATED APPLICATIONS

This application is a continuation application of PCT Patent Application No. PCT/CN2013/072293, filed on Mar. 7, 2013, which claims priority to Chinese Patent Application No. CN201210061127.5, filed on Mar. 9, 2012, the entire contents of all of which are incorporated herein by reference.

FIELD OF THE DISCLOSURE

The present disclosure relates to the field of communication technology and, more particularly, relates to methods, apparatus, and systems for allocating content delivery network (CDN) volume.

BACKGROUND

With development of the Internet, users pay increasing attention to speed and results of website browsing. However, visit quality is seriously affected by the significantly-increased Internet user (netizen) numbers and the increased length of access path to a website. This is particularly the case when the access path to the website gets jammed by a suddenly-occurred large data volume. It is desirable to address such unsatisfied visit quality to access the Internet, especially in regions with increased number of non-local network users.

Content delivery network (CDN) adds a new layer of network structure to existing Internet architecture. CDN is able to deliver website content to a network "border" closest to a user. This is convenient for users to access the website content and to have an increased response speed for the users to access websites.

Figure 1:
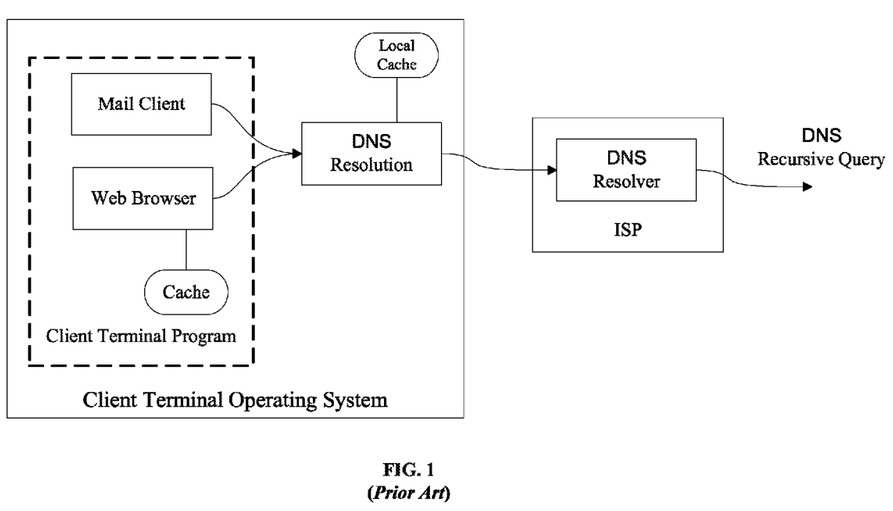
FIG. 1 depicts a work flow of a conventional CDN.

As shown in FIG. 1, when a user visits a website that participates CDN services, the best CDN node closest to the user can be identified by a domain name system (DNS) using re-directing technologies. Meanwhile, a request from the user is directed to this CDN node. When the user's request reaches the designated node, a CDN server (e.g., a high speed cache at the node) provides the user with the user requested content. The detailed procedure is as follows. A user input a domain name of a website to be visited in a browser for the browser to inquiry a local DNS to resolve the domain name. The local DNS sends the request to a main DNS of the website. The main DNS identifies the most appropriate CDN node based on a series of strategies and send the resolved result (i.e., an IP address) to the user. The user can then request content corresponding to the website from the designated CDN node.

For companies with large amount of users, user-visit-volume to an access layer is generally huge on an annual basis and sometimes can even reach a top level. Therefore, these companies, in addition to building their own CDN to accommodate users' visits to the access layer, may purchase services from external CDN service providers to share the volume burden. Due to security concerns, companies are intended to purchase services from different CDN service providers, instead of solely relying on a single CDN service provider. For example, if the overall business visit volume of a company is 1000 G, the company itself may handle 800 G out of the 1000 G, with 100 G out of this 1000 G handled by CDN service provider A and another 100 G out of this 1000 G handled by CDN service provider B. The core resource bandwidth of a CDN server is often provided by an infrastructure operator. Therefore, the capacity of the company to build the CDN on its own depends on negotiations with the infrastructure operator. Once own resources become shortage, the company has to be able to timely allocate a portion of network traffic to external CDN service providers. Therefore, there is a need for a real-time control for allocating CDN volume to the access layer.

BRIEF SUMMARY OF THE DISCLOSURE

Various embodiments provide methods, apparatus, and systems for allocating content delivery network (CDN) volume.

According to various embodiments, there is provided a method for allocating content delivery network (CDN) volume. In this method, a business visit request can be received and dispatched to a plurality of CDN servers for handling the business visit request based on at least one of a time allocation strategy, a request number allocation strategy, and a regional allocation strategy. The time allocation strategy can include pre-allocating a time length of an allocation cycle into a plurality of time slices having a total number comparable to a number of the plurality of CDN servers. The request number allocation strategy can include pre-allocating a proportion of a number for handling the business visit request to each CDN server of the plurality of CDN servers such that the number for handling the business visit request of the each CDN server is proportional to a weight of the each CDN server. The regional allocation strategy can include dispatching the business visit request to the each CDN server of the plurality of CDN servers based on an original region of the business visit request.

According to various embodiments, there is also provided a server. The server can include a receiving module, a selecting module, and a dispatching module. The receiving module can be configured to receive a business visit request. The selecting module can be configured to select a CDN server from a plurality of CDN servers based on at least one of a time allocation strategy, a request number allocation strategy, and a regional allocation strategy. The time allocation strategy can include pre-allocating a time length of an allocation cycle into a plurality of time slices having a total number comparable to a number of the plurality of CDN servers. The request number allocation strategy can include pre-allocating a proportion of a number for handling the business visit request to each CDN server of the plurality of CDN servers such that the number for handling the business visit request of the each CDN server is proportional to a weight of the each CDN server. The regional allocation strategy can include selecting the CDN server based on an original region of the business visit request. The dispatching module can be configured to dispatch the business visit request to the selected CDN server for handling the business visit request.

As disclosed, a business visit request can be dispatched to CDN servers for handling, based on at least one of a time allocation strategy, a request number allocation strategy, and/or a regional allocation strategy. The disclosed methods, apparatus, and systems thus allow the business visit request to be dispatched to multiple CDN service providers for handling. This addresses existing problems of inadequate expansion capacity and lack of flexibility on CDN volume allocation. On the other hand, when a company has sufficient capability to build its own CDN resources, the company may timely reroute CDN volume provided by external service providers to its own CDN, once there are extra resources. Resources can be efficiently utilized and operational cost can be reduced.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

A domain name system (DNS) resolver may use a DNS domain name resolution CNAME (i.e., canonical name) theory to select a content delivery network (CDN) server. When a user visits (or accesses) a DNS using a computer, the computer may store the visited domain name in a CACHE for a specific time period called the time to live (TTL). The CACHE is usually valid for about 1-30 minutes. Within this time frame, if the user re-visits the domain name stored in the CACHE, there is no need to request services from the DNS resolver. The user can directly access the domain name from the CACHE. Therefore, changing the address of the domain name within this time frame does not affect the user who accessed this domain name. The DNS resolver can be used to allocate CDN business volume (or a business visit request). As disclosed, a large CDN business volume can be proportionally and flexibly dispatched to one or multiple CDN service providers. Using one or multiple CDN service providers to simultaneously handle a same business visit request may solve the problems of inadequate expansion capacity and lack of flexibility in CDN volume allocation for existing enterprises or companies.

Figure 2:
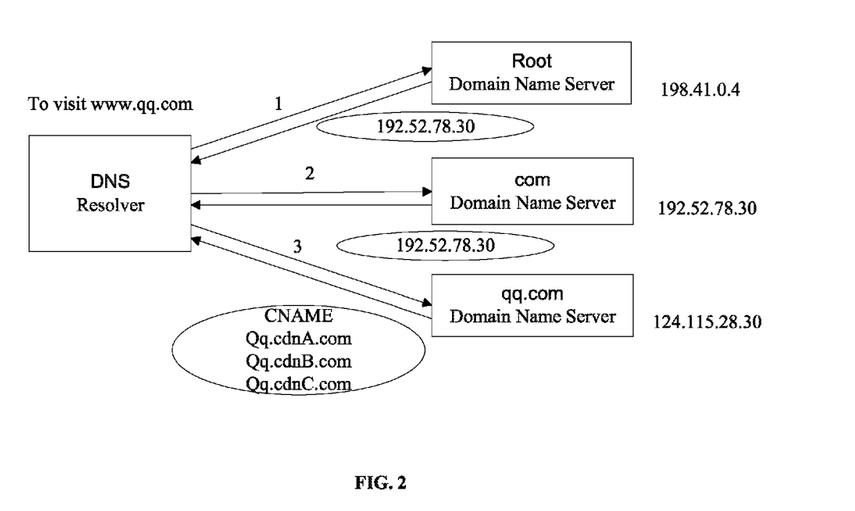
FIG. 2 depicts an exemplary method for using multiple CDN service providers to achieve domain name resolution in accordance with various disclosed embodiments.

FIG. 2 depicts an exemplary method for using multiple CDN service providers to achieve domain name resolution. As shown, when a DNS resolver receives a business visit request to resolve a domain name (for example, a request to resolve www.qq.com), the DNS resolver resolves the domain name in a step-by-step manner. For example, the first Step is to resolve the domain name by a root domain name server to obtain a root domain name (e.g., IP address is 198.41.0.4). The second Step is to resolve the resolved root domain name by a com domain name server to obtain a secondary com domain name (e.g., IP address is 192.52.78.30). The third Step is to resolve the resolved secondary com domain name by a qq.com domain name server to obtain a final qq.com domain name (e.g., IP address is 124.115.28.30).

In an exemplary embodiment, three CDN servers including, e.g., CDN A, CDN B, and CDN C, are used to handle the business visit request as shown in FIG. 2. The three CDN servers can utilize services from CDN A, CDN B, and CDN C to resolve domain names. For example, the IP address (124.115.28.30) corresponding to www.qq.com visit request is registered as A-Record (A means address). The A-Record is used to designate the IP address record corresponding to the host name (or the domain name). The user may direct a website server under this domain name to the user's own web server. The domain name binding with the A-Record can be used to direct the user to a server corresponding to the A-Record as set on the DNS. In an example shown in FIG. 2, a CNAME record corresponding to the A-Record can include: qq.cdnA.com, qq.cdnB.com, and qq.cdnC.com. All of these three CNAME records are mapped to the same domain name, www.qq.com. In such process for handling the business visit request to resolve the IP addresses as depicted in FIG. 2, by DNS recursive query (Step 3), the three CDN servers can be located. This requires the DNS resolver or a GSLB (i.e., global server load balancing) to select one CDN server from the three CDN servers to complete the domain name resolution. Specifically, CDN A may resolve out qq.cdnA.com; CDN B may resolve out qq.cdnB.com; and CDN C may resolve out qq.cdnC.com. No matter which CDN server is selected to resolve the IP address, such resolving is ultimately mapped onto www.qq.com that hosts the A-Record.

In various embodiments, by slicing time and/or weighting request number, and/or by accessing an original region of a user, service price of CDN, current service quality of CDN, current CDN resource and/or other factors, interpretation can be made to allow one or multiple CDN service providers to simultaneously and dynamically (or flexibly) handle a same business visit request. This can significantly improve business flexibility and expandability and significantly improve effective utilization rate of resources. As used herein, the terms "business visit request", "visit request", "request", "business visit" and "visit business" can be used interchangeably.

An exemplary network structure for a CDN volume allocation strategy includes: a DNS resolver and multiple CDN servers (e.g., CDN A, CDN B, CDN C, etc.). The DNS resolver selects a CDN server from the multiple CDN servers based on, e.g., a time allocation strategy, a request number allocation strategy, and/or a regional allocation strategy. The DNS resolver then dispatches a received visit request to the selected CDN server. The CDN server can then be used to resolve an IP address corresponding to a domain name and return the resolved results to the business visit requester.

Figure 3:
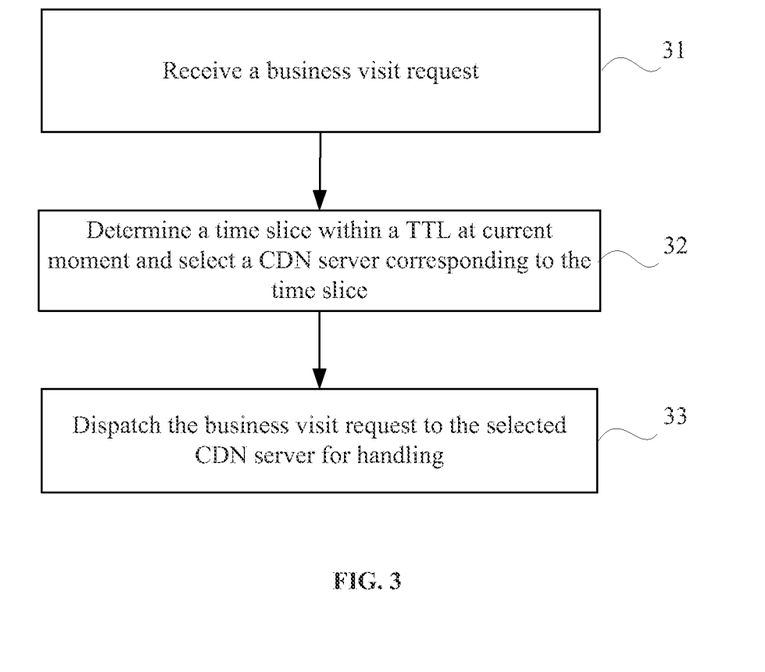
FIG. 3 depicts an exemplary method for allocating CDN volume in accordance with various disclosed embodiments.
Figure 4:
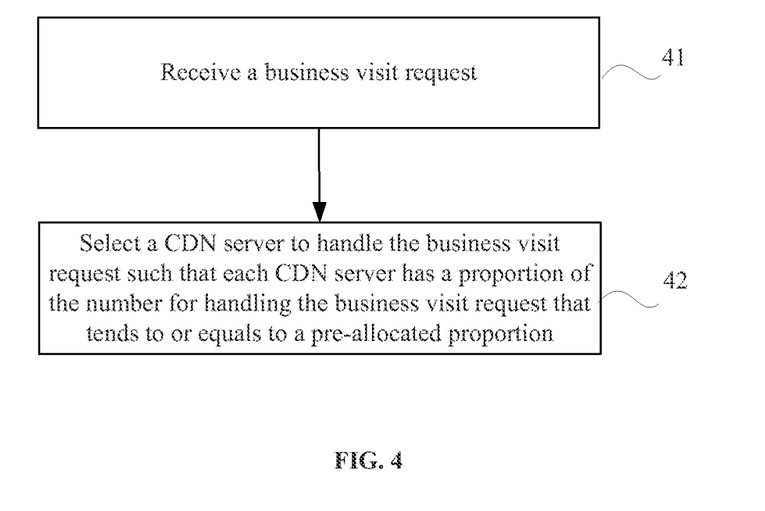
FIG. 4 depicts another exemplary method for allocating CDN volume in accordance with various disclosed embodiments.
Figure 5:
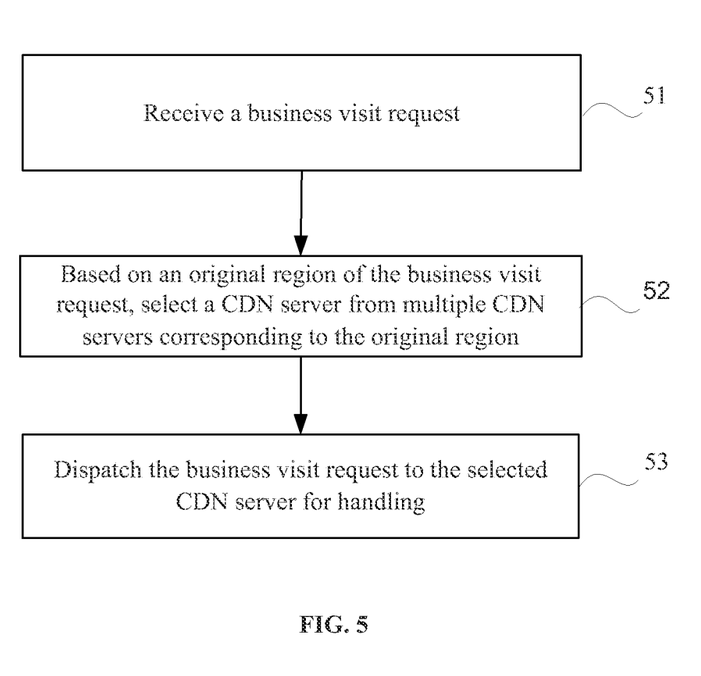
FIG. 5 depicts another exemplary method for allocating CDN volume in accordance with various disclosed embodiments.

FIGS. 3-5 depict various exemplary strategies for a CDN volume allocation. For example, FIG. 3 depicts an exemplary method for allocating CDN volume based on a time allocation strategy.

In this method, weight of each CDN server can be pre-set on a DNS resolver. TTL that is used for caching DNS records can be pre-set on the DNS resolver. As described, TTL refers to a caching time of a DNS record on the DNS resolver. The DNS resolver can pre-allocate the TTL into time slices having a total number comparable to a number of a plurality of CDN servers. One time slice corresponds to one CDN server. Each CDN server corresponds to a different time slice. A length of each time slice is proportional to a weight of each CDN server.

Referring to FIG. 3, in Step 31, the DNS resolver receives a business visit request. In Step 32, the DNS resolver determines a time slice within a TTL at a current moment and selects a CDN server (from the plurality of CDN servers) corresponding to the time slice. In Step 33, the DNS resolver dispatches the business visit request to the selected CDN server for handling.

In an exemplary embodiment, a weighted ratio of CDN servers (e.g., including CDN A, CDN B, and CDN C) that are pre-set on the DNS resolver can include: CDN A:CDN B:CDN C=6:2:2. In this case, one TTL is divided into three time slices including, e.g., A, B, and C. That is, one TTL equals to A+B+C. Because the weighted ratio of A, B, and C is about 6:2:2, accordingly about 60% of the TTL time is allocated to CDN A, about 20% of the TTL time is allocated to CDN B, and about 20% of the TTL time is allocated to CDN C. For example, if one TTL is about 10 minutes, the DNS resolver may dispatch the business visit request, received in the first 6 minutes, to CDN A server; dispatch the business visit request, received in the $7^{th}$ and $8^{th}$ minutes, to CDN B server; and dispatch the business visit request, received in the $9^{th}$ and $10^{th}$ minutes, to CDN C server.

Referring back to the example depicted in FIG. 2, the method in FIG. 3 can include the following. Within the time slice A, the DNS resolver directs the CNAME of www.qq.com to be served by a service provider having the CDN A server. Within the time slice B, the DNS resolver directs the CNAME of www.qq.com to be served by a service provider having the CDN B server. Within the time slice C, the DNS resolver directs the CNAME of www.qq.com to be served by a service provider having the CDN C server.

In addition, the weight of each CDN server can be determined according to service quality and/or service price of each CDN server. The user can monitor the service quality of each CDN service provider to determine the quality of a business visit request. When the service quality of one of the service providers changes and no longer meets the needs, the weight of this CDN server can be dynamically adjusted such that the time slices of this CDN server and the number of CNAME authorizations of this CDN service provider can be adjusted. The business overall performance can be improved.

In various embodiments, considering operational cost and according to the price provided by each service provider, the time slice of each CDN server can be adjusted to allocate the CDN volume. By pre-setting a weight of each CDN server and the TTL, the TTL can be divided into time slices having a total number equal to the number of CDN servers. Based on the weighted ratio of each CDN server, the one TTL can be allocated to each CDN server of the plurality of CDN servers to achieve a dynamic allocation of the CDN volume.

FIG. 4 depicts another exemplary method for allocating CDN volume based on a request number allocation strategy. In this method, a weight of each CDN server of a plurality of CDN servers can be pre-set on a DNS resolver. A proportion of a number for handling a business visit request can be pre-allocated to each CDN server. The number for handling the business visit request of each CDN server can be proportional to the weight of each CDN server.

In Step 41, a DNS resolver receives a business visit request. In Step 42, the DNS resolver selects a CDN server to handle the business visit request, such that each CDN server has a proportion of a number for handling a business visit request that tends to be or equals to a pre-allocated proportion.

When a GSLB (i.e., global server load balancing) or a DNS resolver, receives a business visit request to access an A-Record, the GSLB or the DNS resolver can conduct a weighted calculation on the business visit request to select a CDN server. If the time is long enough, the proportion of the number for handling the business visit request by each CDN server may tend to be or equal to the pre-allocated proportion. For example, a weight of a CDN service provider A, a CDN service provider B, and a CDN service provider C can be respectively pre-allocated to be about 60%, about 20%, and about 20%.

A polling method may be employed to conduct a weighted calculation on the business visit request to select the CDN server. For example, within one TTL, assuming there are 100 business visit requests, these 100 business visit requests can be divided into 10 polls for selecting CDN servers according to a weighted ratio, e.g., of about 6:2:2, for the received business visit request. That is, CDN A can be selected for the first 1-6 visit requests; CDN B can be selected for the $7^{th}$ and $8^{th}$ requests; CDN C can be selected for the $9^{th}$ and $10^{th}$ requests, CDN A can be selected for the $11^{th}$ to $16^{th}$ requests; CDN B can be selected for the $17^{th}$ and $18^{th}$ requests; and CDN C can be selected for the $19^{th}$ to $20^{th}$ requests . . . and so on. This pattern can be followed to select CDN servers for each poll of the 10 polls.

For conducting a weighted calculation of each business visit request, a CDN server can be selected by randomly picking a number for each business visit request. For example, assuming the weighted ratio of the plurality of CDN servers is about 6:2:2, whenever a DNS resolver receives a business visit request, a random number in the range of (0, 1) can be automatically generated according to the assumed, weighted ratio. For example, random numbers are generated respectively within three ranges of (0, 0.6), (0.7, 0.8), and (0.9, 1) for the range (0, 1), and the DNS resolver selects a CDN server within each of these three ranges. For example, CDN A can be selected for a visit request corresponding to a random number within the range of (0, 0.6); CDN B can be selected for a visit request corresponding to a random number within the range of (0.7, 0.8); and CDN C can be selected for a visit request corresponding to a random number within the range of (0.9, 1).

In addition, the weight of each CDN server can be determined according to service quality and/or service price of each CDN server. The user can monitor the service quality of each CDN service provider to determine the quality of the business visit request. When the service quality of one of the service providers changes and no longer meets the needs, the weight of this CDN server can be dynamically adjusted such that the number for handling the business visit request of this CDN server and the number of CNAME authorizations of this CDN service provider can be adjusted. The business overall performance can be improved.

Considering operational cost and according to the service price provided by each service provider, the number for handling the business visit request by each CDN server can be adjusted to allocate the CDN volume. By pre-allocating a proportion of the number for handling the business visit request proportional to a weight of each CDN, CDN volume can be dynamically allocated by weighted allocation of the request number.

FIG. 5 depicts another exemplary method for allocating CDN volume based on a regional allocation strategy. In Step 51, a DNS resolver receives a business visit request. In Step 52, based on an original region of the business visit request, the DNS resolver selects a CDN server from multiple CDN servers corresponding to the original region. The DNS resolver determines the original region of the business visit request based on an IP address of the business visit request.

In Step 53, the DNS resolver dispatches the business visit request to the selected CDN server for handling. In one embodiment, a regional allocation strategy for a business visit request of all related regions can be pre-determined. For example, users from a first region such as Guangdong province can be handled by CDN service provider A (CDN A), and users from a second region such as Zhejiang province can be handled by CDN service provider B (CDN B), while users from a third region such as Beijing can be handled by CDN service provider C (CDN C). That is, when a domain name server (e.g., GSLB) receives a business visit request to access an A-Record, a CNAME record can be directed to a CDN service provider corresponding to an original region of the business visit request to provide the service. CDN volume can thus be allocated by a visit region.

In this manner, the business visit request can be dispatched to a plurality of CDN servers for handling, based on the time allocation strategy, the request number allocation strategy, and/or the regional allocation strategy. This allows the business visit request to be dispatched to multiple CDN service providers for handling. This addresses existing problems of inadequate expansion capacity and lack of flexibility on CDN volume allocation. On the other hand, when a company has sufficient capability to build its own CDN resources, the company may timely reroute CDN volume provided by external service providers to its own CDN once there are extra resources. Resources can be efficiently utilized and operational cost can be saved.

Moreover, the disclosed CDN volume allocation methods do not necessarily mean that each CDN server of the plurality of CDN servers has to be allocated with the business visit request for handling. Once the allocation strategy is determined, certain CDN server(s) may be allocated with zero business visit request.

According to various embodiments, the disclosed methods for dispatching a business visit request to one or more CDN servers of a plurality of CDN servers are not limited to the above-mentioned exemplary strategies, other suitable strategies can be encompassed. In addition, the above-mentioned exemplary strategies can be used individually or in combination to form desired allocation strategies for different business visit requests as desired. Accordingly, such desired allocation strategies can be used to allocate any business visit requests.

In one embodiment, a first step of dispatching a business visit request can include adjusting a CDN volume (e.g., to determine weight of each CDN) based on service quality and/or service price. And then, a second step of dispatching the business visit request can include using a time allocation strategy, a request number allocation strategy, and/or a regional allocation strategy.

Alternatively, a first step of dispatching a business visit request can include use of a time allocation strategy (e.g., allocation of time slices: allocating time to CDN group 1 and CDN group 2), followed by a second step of dispatching the business visit request including a request number allocation strategy and a regional allocation strategy (e.g., in CDN group 1, allocating the number of requests to CDN a and b; and in CDN group 2, allocating the business visit request to CDN c and d based on the original region of business request).

Figure 6:
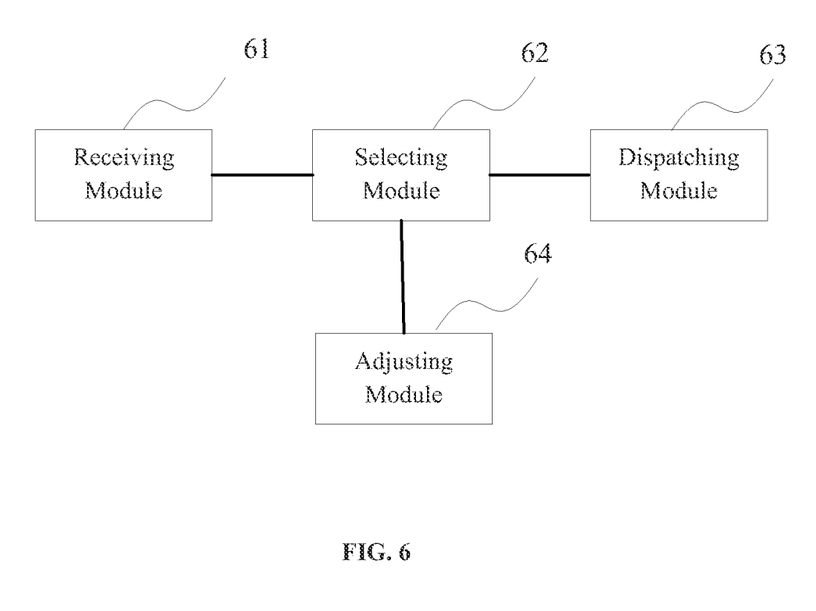
FIG. 6 depicts a structural diagram of an exemplary DNS resolver in accordance with various disclosed embodiments.

FIG. 6 depicts a structural diagram of an exemplary DNS resolver in accordance with various disclosed embodiments. The exemplary DNS resolver includes a receiving module 61, a selecting module 62, a dispatching module 63, and/or an adjusting module 64.

The receiving module 61 is used to receive a business visit request. The selecting module 62 is used to select a CDN server from multiple CDN servers based on at least one of a time allocation strategy, a request number allocation strategy, and/or a regional allocation strategy.

When the time allocation strategy is used to select the CDN server, the selecting module 62 is used to pre-allocate a time length of an allocation cycle (e.g., a TTL) into time slices having a total number comparable to the number of the multiple CDN servers. One time slice corresponds to one CDN server. Each time slice has a length proportional to a weight of each CDN server. In addition, when the receiving module 61 receives the business visit request, the time slice at a current moment in a current allocation cycle and the corresponding CDN server can be determined.

When the request number allocation strategy is used to select the CDN server, the selecting module 62 is used to pre-allocate a proportion of a number for handling the business visit request to each CDN server such that the number for handling the business visit request of each CDN server is proportional to the weight of each CDN server. Moreover, when the receiving module 62 receives the above-mentioned business requests, the receiving module 62 selects a CDN server such that each CDN server has a proportion of the number for handling the business visit request that tends to be or equals to the pre-allocated proportion.

When the regional allocation strategy is used to select the CDN server, the receiving module 62 is used to select a CDN server based on an original region of the business visit request, after receiving the business visit request. The selecting module 62 is used to identify the original region of the business visit request according to an IP address of the business visit request.

In some embodiments, the selecting module 62 is used to determine a weight of each CDN server based on service quality and/or service price of each CDN server when the receiving module 61 receives the business visit request. Further, the selecting module 62 is used to select the CDN server based on at least one of the time allocation strategy, the request number allocation strategy, and/or the regional allocation strategy.

In other embodiments, the selecting module 62 is used to select a CDN server based on at least two strategies selected from the time allocation strategy, the request number allocation strategy, the regional allocation strategy, the service quality of each CDN server, and/or the service price provided by each CDN server.

The dispatching module 63 is used to dispatch the business visit request to the selected CDN server for handling. The adjusting module 64 is used to adjust the weight of each CDN server based on, e.g., service quality, service price, etc. of each CDN server.

Figure 7:
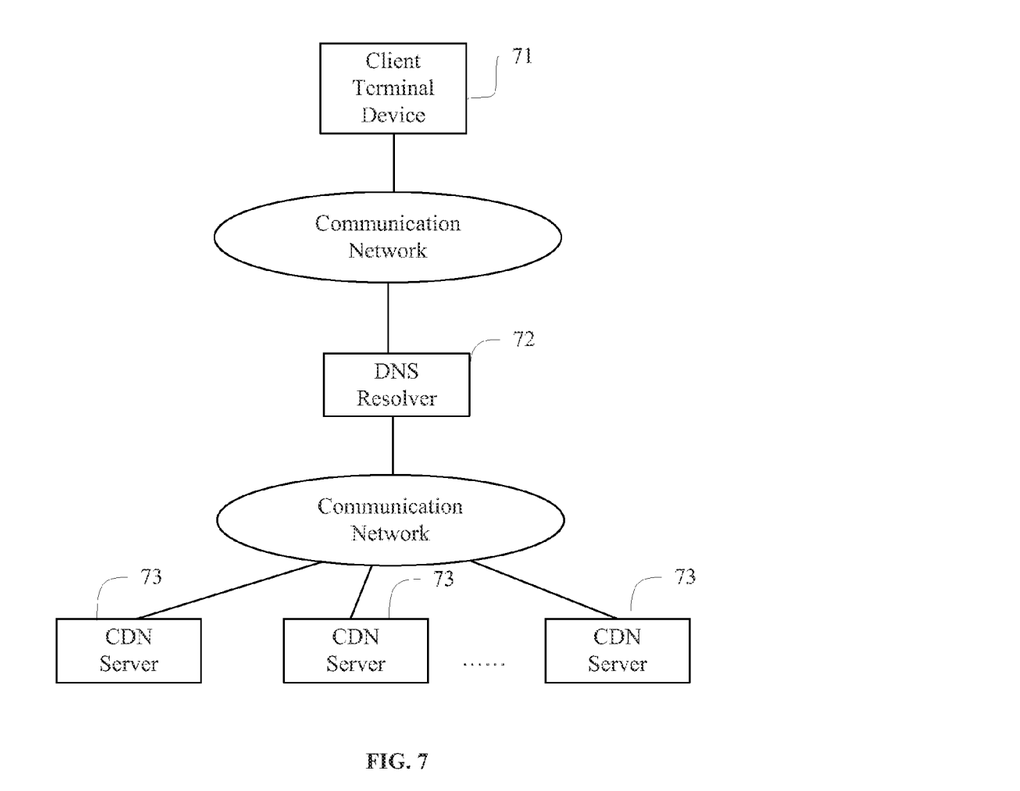
FIG. 7 depicts a structure diagram of an exemplary system for allocating CDN volume in accordance with various disclosed embodiments.

FIG. 7 depicts a structure diagram of an exemplary system for allocating CDN volume in accordance with various disclosed embodiments. The exemplary system in FIG. 7 includes, at least one client terminal device 71, at least two CDN servers 73, and/or a DNS resolver 72. The client terminal device 71 initiates a business visit request. The business visit request is received by the DNS resolver 72 and dispatched to the CDN servers 73.

The client terminal device 71 may include any appropriate user terminal with wireless or wired capabilities. The client terminal device 71 can be stationary or mobile. The client terminal device 71 can include, for example, a personal computer (PC), a work station computer, a server computer, a hand-held computing device (tablet), a smart phone or mobile phone, a touch terminal, or any other user-side computing device. In various embodiments, the client terminal device 71 may include a network access device.

The DNS resolver 72 may be the DNS resolver as depicted in FIG. 6. The DNS resolver 72 and/or the CDN servers 73 may include any appropriate server computer configured, e.g., for domain name resolution and/or CDN volume allocation. The DNS resolver 72 and/or the CDN servers 73 may be maintained and/or operated by a service operator.

The client terminal device 71 may communicate with the DNS resolver 72 and/or the CDN servers 73 through a communication network, such as a wireless network or the Internet, etc. Although only certain number of each of the client terminal device, the DNS resolver, and/or the CDN server is shown in the system of FIG. 7, any number of each of the client terminal device, the DNS resolver, and/or the CDN server may be included.

Figure 8:
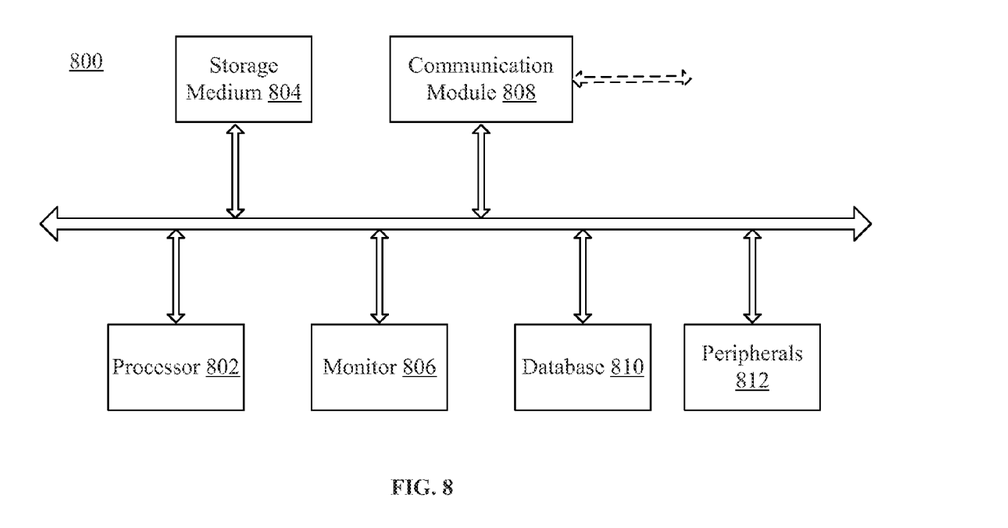
FIG. 8 depicts a block diagram of an exemplary computing system consistent with the disclosed embodiments.

The client terminal device 71, the DNS resolver 72, and/or the CDN servers 73 may be implemented on any appropriate computing platform. FIG. 8 shows a block diagram of an exemplary computer system 800 capable of implementing the client terminal device 71, the DNS resolver 72, and/or the CDN servers 73.

As shown in FIG. 8, computer system 800 may include a processor 802, a storage medium 804, a monitor 806, a communication module 808, a database 810, and peripherals 812. Certain devices may be omitted and other devices may be included.

Processor 802 may include any appropriate processor or processors. Further, processor 802 can include multiple cores for multi-thread or parallel processing. Storage medium 804 may include memory modules, such as ROM, RAM, and flash memory modules, and mass storages, such as CD-ROM, U-disk, hard disk, etc. Storage medium 804 may store computer programs for implementing various processes, when executed by processor 802.

Further, peripherals 812 may include I/O devices such as keyboard and mouse, and communication module 808 may include network devices for establishing connections through a wireless or wired communication network. Database 810 may include one or more databases for storing certain data and for performing certain operations on the stored data, such as database searching.

In various embodiments, a business visit request can be dispatched to CDN servers for handling, based on at least one of a time allocation strategy, a request number allocation strategy, and/or a regional allocation strategy. The disclosed methods, apparatus, and systems thus allow the business visit request to be dispatched to multiple CDN service providers for handling. This addresses existing problems of inadequate expansion capacity and lack of flexibility on CDN volume allocation. On the other hand, when a company has sufficient capability to build its own CDN resources, the company may timely reroute CDN volume provided by external service providers to its own CDN, once there are extra resources. Resources can be efficiently utilized and operational cost can be reduced.

In various embodiments, the disclosed modules can be configured in one apparatus or configured in multiple apparatus as desired. The modules disclosed herein can be integrated in one module or in multiple modules. Each of the modules disclosed herein can be divided into one or more sub-modules, which can be recombined in any manner.

The disclosed embodiments can be examples only. One of ordinary skill in the art would appreciate that suitable software and/or hardware (e.g., a universal hardware platform) may be included and used to predict, manage, and execute the disclosed methods, strategies, and systems. For example, the disclosed embodiments can be implemented by hardware only, which alternatively can be implemented by software products only. The software products can be stored in a storage medium. The software products can include suitable commands to enable a client terminal device (e.g., including a mobile phone, a personal computer, a server, or a network device, etc.) to implement the disclosed embodiments.

Other applications, advantages, alternations, modifications, or equivalents to the disclosed embodiments are obvious to those skilled in the art.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Various embodiments provide methods, apparatus, and systems for allocating content delivery network (CDN) volume. In one embodiment, there is provided a method for allocating content delivery network (CDN) volume. In this method, a business visit request can be received and dispatched to a plurality of CDN servers for handling the business visit request, based on at least one of a time allocation strategy, a request number allocation strategy, and a regional allocation strategy. The time allocation strategy can include pre-allocating a time length of an allocation cycle into a plurality of time slices having a total number comparable to a number of the plurality of CDN servers. The request number allocation strategy can include pre-allocating a proportion of a number for handling the business visit request to each CDN server of the plurality of CDN servers such that the number for handling the business visit request of the each CDN server is proportional to a weight of the each CDN server. The regional allocation strategy can include dispatching the business visit request to the each CDN server of the plurality of CDN servers based on an original region of the business visit request.

The disclosed methods, apparatus, and systems thus allow the business visit request to be dispatched to multiple CDN service providers for handling. This addresses existing problems of inadequate expansion capacity and lack of flexibility on CDN volume allocation. On the other hand, when a company has sufficient capability to build its own CDN resources, the company may timely reroute CDN volume provided by external service providers to its own CDN, once there are extra resources. Resources can be efficiently utilized and operational cost can be reduced.

What is claimed is:

1. A method for allocating content delivery network (CDN) volume, comprising:
   receiving a business visit request; and
   dispatching the business visit request to a plurality of CDN servers for handling the business visit request based on a time allocation strategy,
   wherein:
      the time allocation strategy comprises pre-allocating a time length of an allocation cycle into a plurality of time slices having a total number comparable to a number of the plurality of CDN servers,
      one time slice of the plurality of time slices corresponds to one CDN server of the plurality of CDN servers, and each time slice of the plurality of time slices has a length proportional to a weight of the each CDN server, and the method further comprising determining a time slice at a current moment in a current allocation cycle and determining a corresponding CDN server for handling the business visit request, after receiving the business visit request.

2. The method of claim 1, wherein dispatching the business visit request to the plurality of CDN servers for handling the business visit request further comprises:

dividing the plurality of CDN servers to a plurality of CDN groups, wherein each group includes one or more CDN servers;

dispatching the business visit request to the plurality of CDN groups using a first allocation strategy; and within each CDN group, dispatching the business visit request to the one or more CDN servers using a second allocation strategy;

wherein:

the first allocation strategy is one of the time allocation strategy, a request number allocation strategy, and a regional allocation strategy; and the second allocation strategy is one of the time allocation strategy, the request number allocation strategy, and the regional allocation strategy.

3. The method of claim 2, wherein:

the request number allocation strategy comprises pre-allocating a proportion of a number for handling the business visit request to each CDN server of the plurality of CDN servers such that the number for handling the business visit request of the each CDN server is proportional to a weight of the each CDN server, and the regional allocation strategy comprises dispatching the business visit request to the each CDN server of the plurality of CDN servers based on an original region of the business visit request.

4. The method of claim 3, wherein the request number allocation strategy further comprises:

after receiving the business visit request, selecting a CDN server from the plurality of CDN servers for handling the business visit request such that the each CDN server has a proportion of the number for handling business request that tends to be or equals to the pre-allocated proportion.

5. The method of claim 3, further comprising determining the original region of the business visit request according to an IP address of the business visit request.

6. The method of claim 1, wherein the allocation cycle comprises a time to live (TTL).

7. The method of claim 1, wherein the dispatching of the business visit request comprises:

determining a weighted service of the each CDN based on one or more of a service quality and a service price of the each CDN server, after receiving the business visit request, and dispatching the business visit request based on the at least one of a time allocation strategy, a request number allocation strategy, and a regional allocation strategy.

8. The method of claim 1, further comprising dispatching the business visit request to the each CDN server of the plurality of CDN servers based on at least two strategies selected from: the time allocation strategy, the request number allocation strategy, the regional allocation strategy, a service quality of the each CDN server, and a service price of the each CDN server.

9. A server comprising one or more processors, memory, and one or more program modules stored in the memory and to be executed by the one or more processes, the one or more program modules comprising:

a receiving module, configured to receive a business visit request;

a selecting module, configured to select a CDN server from a plurality of CDN servers based on a time allocation strategy, wherein: the time allocation strategy comprises pre-allocating a time length of an allocation cycle into a plurality of time slices having a total number comparable to a number of the plurality of CDN servers, a dispatching module, configured to dispatch the business visit request to the selected CDN server for handling the business visit request, wherein one time slice of the plurality of time slices corresponds to one CDN server of the plurality of CDN servers, and each time slice of the plurality of time slices has a length proportional to a weight of the each CDN server, and wherein the selecting module is configured to determine a time slice at a current moment in a current allocation cycle and determine a corresponding CDN server for handling the business visit request, after the receiving module receives the business visit request and before the dispatching module dispatches the business visit request.

10. The server of claim 9, wherein the selecting module is further configured to:

divide the plurality of CDN servers to a plurality of CDN groups, wherein each group includes one or more CDN servers;

select one of the plurality of CDN groups using a first allocation strategy; and select one of the one or more CDN servers from the selected CDN group using a second allocation strategy;

wherein:

the first allocation strategy is one of the time allocation strategy, a request number allocation strategy, and a regional allocation strategy; and the second allocation strategy is one of the time allocation strategy, the request number allocation strategy, and the regional allocation strategy.

11. The method of claim 10, wherein:

the request number allocation strategy comprises pre-allocating a proportion of a number for handling the business visit request to each CDN server of the plurality of CDN servers such that the number for handling the business visit request of the each CDN server is proportional to a weight of the each CDN server, and the regional allocation strategy comprises dispatching the business visit request to the each CDN server of the plurality of CDN servers based on an original region of the business visit request.

12. The server of claim 11, wherein, based on the request number allocation strategy, the selecting module is configured to select the CDN server such that the each CDN server has a proportion of the number for handling business request that tends to be or equals to the pre-allocated proportion, after the receiving module receives the business visit request.

13. The server of claim 11, wherein the selecting module is configured to determine the original region of the business visit request according to an IP address of the business visit request.

14. The server of claim 9, wherein the selecting module is configured to determine a weighted service of the each CDN based on one or more of a service quality and a service price of the each CDN server, after the receiving module receives the business visit request and before the dispatching module dispatches the business visit request.

15. The server of claim 9, wherein the selecting module is configured to select the CDN server based on at least two strategies selected from: the time allocation strategy, the request number allocation strategy, the regional allocation strategy, a service quality of the each CDN server, and a service price of the each CDN server.

16. A system for allocating content delivery network (CDN) volume comprising at least one server of claim 9, at least two CDN servers, and at least one client terminal device, wherein the at least one client terminal device requests the business visit request, the at least one server receives the business visit request and dispatches the business visit request to the at least two CDN servers.

17. The system of claim 16, wherein the at least one server comprises a domain name system (DNS) resolver.

18. The method of claim 7, further comprising:
   monitoring the service quality of each CDN server to determine a quality of the business visit request; and
   when the service quality of a CDN server changes, dynamically adjusting the weight of the CDN server such that the time slice corresponding to the CDN server is adjusted.

* * * * *